United States Patent [19]

Rosen

[11] 4,442,498

[45] Apr. 10, 1984

[54] ARITHMETIC UNIT FOR USE IN DATA PROCESSING SYSTEMS

[76] Inventor: Josh Rosen, 9A Lincoln St., Westboro, Mass. 01581

[21] Appl. No.: 256,726

[22] Filed: Apr. 23, 1981

[51] Int. Cl.³ .............................................. G06F 7/48
[52] U.S. Cl. ................................. 364/745; 364/748; 364/749; 364/787
[58] Field of Search ................ 364/745, 748, 749, 787

[56] References Cited

U.S. PATENT DOCUMENTS

| | | | |
|---|---|---|---|
| 3,699,326 | 10/1972 | Kindell et al. | 364/745 |
| 3,842,250 | 10/1974 | Anderson | 364/745 |
| 4,295,203 | 10/1981 | Joyce | 364/748 |
| 4,319,335 | 3/1982 | Rubinfield | 364/787 |
| 4,338,675 | 7/1982 | Palmer et al. | 364/748 |

*Primary Examiner*—Jerry Smith

[57] ABSTRACT

A data processing system using unique procedures for handling various arithmetic operations. Thus, in floating point arithmetic mantissa calculations the system uses a novel technique for inserting a round bit into the appropriate bit of the floating point result wherein a look-ahead carry bit generator stage is used for such purpose to reduce the overall mantissa calculation time. Further, the system utilizes unique logic which operates in parallel with the floating point exponent calculation logic for effectively predicting whether or not an overflow or underflow condition will be present in the final exponent result and for informing the system which such conditions have occurred. Moreover, the system utilizes a simplified technique for computing the extension bits which are required in multiply and divide computations wherein a programmable array logic unit and a four-bit adder unit are combined for such purposes.

5 Claims, 12 Drawing Figures

ARITHMETIC UNIT FOR USE IN DATA PROCESSING SYSTEMS

INTRODUCTION

This invention relates generally to data processing systems which utilize fixed and floating-point arithmetic units and, more particularly, to unique techniques for "rounding" floating point calculations, for handling overflow and underflow conditions therein, and for providing unique arithmetic word extension logic for use in performing multiplication and division operations.

BACKGROUND OF THE INVENTION

The representation of numbers in data processing systems, particularly non-integer numbers, requires the introduction of a radix point into the notation. For example, data processing systems may employ "fixed point notation" wherein the radix point is placed immediately to the right of the least significant bit or placed immediately to the right of the sign bit before the first information bit.

A further option is often referred to as "floating point notation" in which the numbers are represented by a sign, an exponent, and a mantissa. Such technique is described in many texts, one example being "Computer Architecture", Caxton C. Foster, Van Nostrand Reinhold Co., New York 1976, pages 16 et seq.

Calculations upon the mantissa may be performed by operating on groups of bits (i.e., "bit slices") of the mantissa words involved, the computation for each bit slice producing a "carry" bit to be added to the adjacent bit slice until the calculation is completed for the entire word. For example, overall mantissa words having 32 bits may use eight 4-bit slice logic units in such calculations.

If each bit slice is permitted to produce its "carry" bit only after the operation for such bit slice has occurred and the carry bit is then added to the next bit slice, the overall calculation time is considerably longer than desired. In order to reduce the overall calculation time, techniques for effectively computing the carry bits ahead of time, i.e., so-called "look ahead" carry bit techniques have been devised wherein the various carry bits are computed in parallel and simultaneously with the bit slice computation operations. Such techniques have been used for many years and are well known to those in the art.

After the overall computation has been completed, a "round" bit is then computed and added to the last bit slice as discussed below, the round bit being determined by a plurality of bits, often referred to as "guard" bits, which form a particular coded word which must be suitably decoded to produce the round bit. The round bit is usually calculated following the overall computation and then added to the least significant bit of the unrounded floating point result at the appropriate carry bit location, an operation which can be thought of as an effective multiplexing operation, i.e., the round bit being inserted during the rounding cycle instead of the associated carry bit. For example, when using 32-bit words, the unrounded floating point result comprises 32 bits and is then rounded to a final result having 24 bits. In such case, the unbiased rounding algorithm uses the eight bits of least significance to determine how to round the final 24-bit result. However, the insertion of the round bit to the completed floating point computation result by effective multiplexing techniques adds additional time to all of the calculations required for the mantissa calculation. It is desirable to devise techniques to save this time.

Further, in calculating the exponent portion of a floating point result, if the calculation does not produce a value which falls within a particular exponent value range (i.e., a value having a particular number of bits), an "overflow" or an "underflow" condition occurs. If either such condition occurs, the system must provide an indication thereof so that appropriate sub-routines for handling such conditions can be invoked and the status of the floating point condition must be appropriately communicated to the overall system. In order to save time in the overall operation it is desirable to accelerate the detection and communication of exponent overflow and underflow conditions.

Further, in a multiply or divide operation, conventional algorithms which are used for such operations require that certain operands be extended, i.e., that additional bits be added to the operand words. For example, in a particular multiply algorithm such operands must be extended by two bits, while in a particular divide algorithm such operands must be extended by one bit. Extension techniques which require the use of extra bit slice logic units add to the hardware complexity of the arithmetic units or floating point units. It is desirable to devise less cumbersome extension techniques for such purpose to avoid such hardware complexity.

BRIEF SUMMARY OF THE INVENTION

In order to achieve rounding of mantissa computations, a novel modification to the conventional "look ahead" carry technique is utilized in accordance with the invention, wherein a portion of an existing "look ahead" stage (i.e. that stage normally used to generate the carry bit which is to be added to the least significant bit slice of the unrounded floating point result) is used for the round bit calculation, the round bit then being added as the carry bit in the least significant bit of the unrounded floating point result in parallel with all the other carry bits calculated by the remaining parallel look ahead stages.

Further, in order to provide relatively fast detection of overflow and underflow conditions during exponent calculations, rather than making a complete addition of the exponent value and then detecting the overflow and underflow conditions thereafter, the system in accordance with the invention utilizes overflow/underflow logic which operates in parallel with the final exponent computation and in effect predicts whether or not an overflow or an underflow condition will exist in the final exponent calculation. In a preferred embodiment such logic uses an extra adder stage, together with associated logic to produce a signal which provides an indication to the system that an overflow or underflow condition exists.

Further, the invention makes use of simplified arithmetic unit extension logic, using less complex programmable array logic and addition stages to provide a simpler technique for operand extensions during multiply and divide operations.

DESCRIPTION OF THE INVENTION

The invention can be described in more detail with the help of the accompanying drawings wherein.

Figure 1:
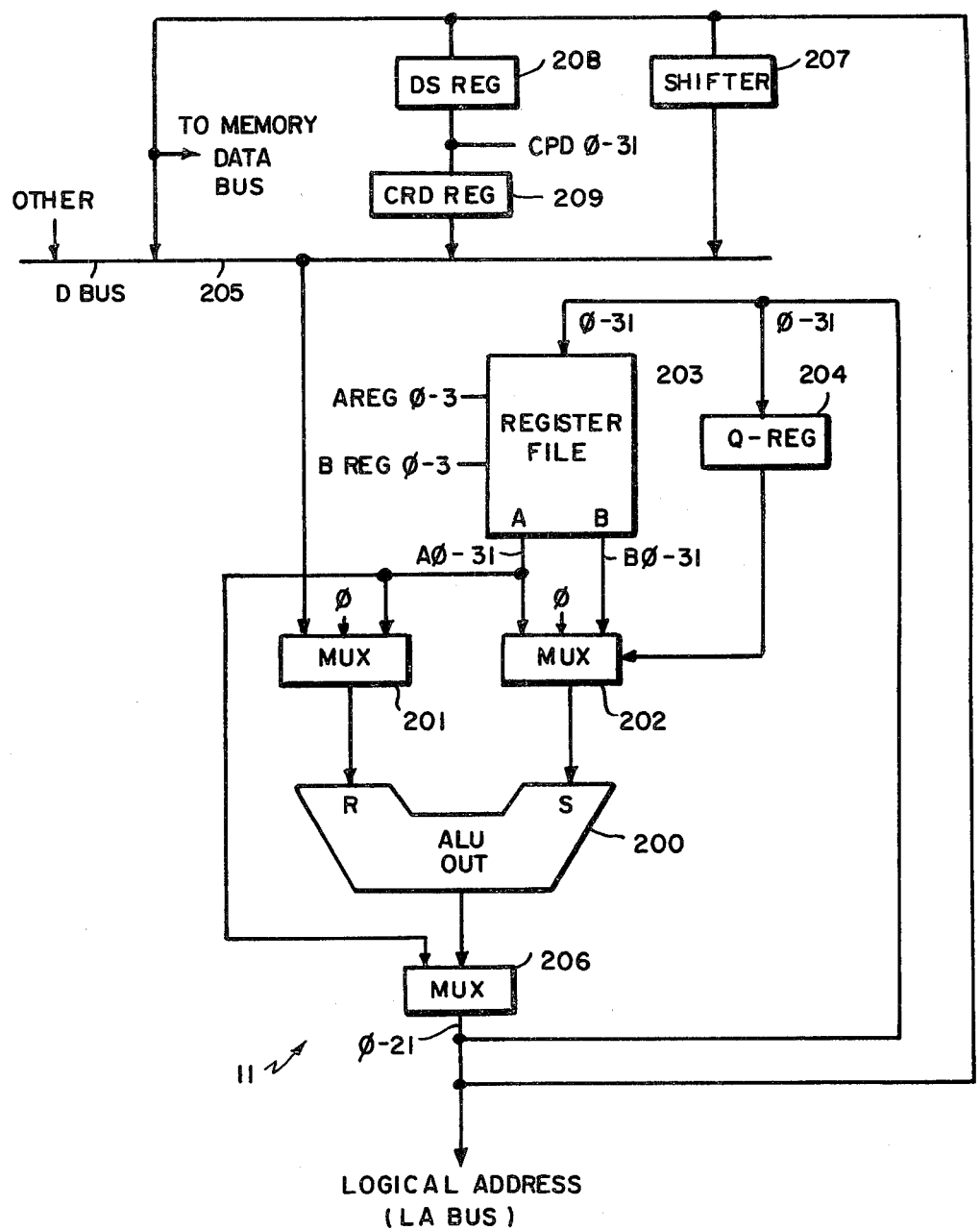
FIG. 1 shows a block diagram of an arithmetic unit for performing arithmetic calculations.

The invention disclosed herein can be best described in the context of a particular data processing system, such as that disclosed in U.S. patent application Ser. No. 143,561, filed Apr. 25, 1980 by Rasala et al., and incorporated by reference herein. A broad block diagram of the arithmetic logic unit (ALU) used therein is shown in FIG. 154 of the application which is reproduced herein as FIG. 1. Specific logic diagrams required to understand the invention described herein are shown here in FIGS. 2-5 and FIGS. 7 and 8. In such system, as is conventional for 32-bit mantissa calculations, the computation is made in four-bit slices as shown by the 4-bit microprocessor slice logic units 10A-10H. Two 4-bit values are operated on, and a 1-bit carry value is added to the result of this operation to produce the 4-bit output (DS-outputs). Thus the slice units produce an unrounded floating point result formed as the following 4-bit slices shown below:

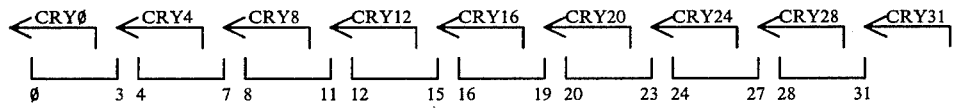

UNROUNDED FLOATING POINT RESULT    GUARD BITS

Figure 3:
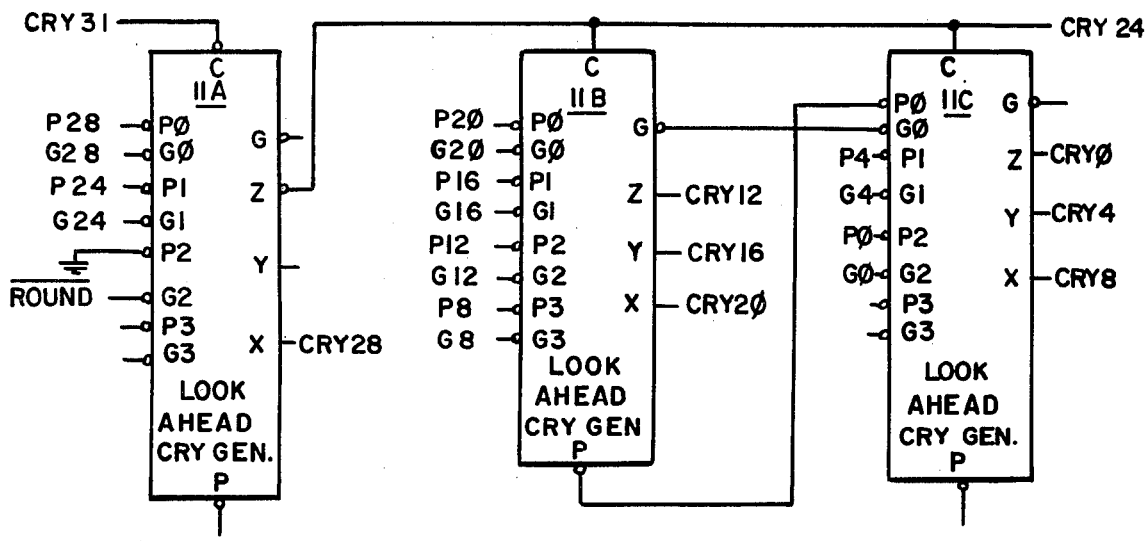
FIG. 3 shows specific look-ahead logic units for computing the carry bits for mantissa calculations.
Figure 4:
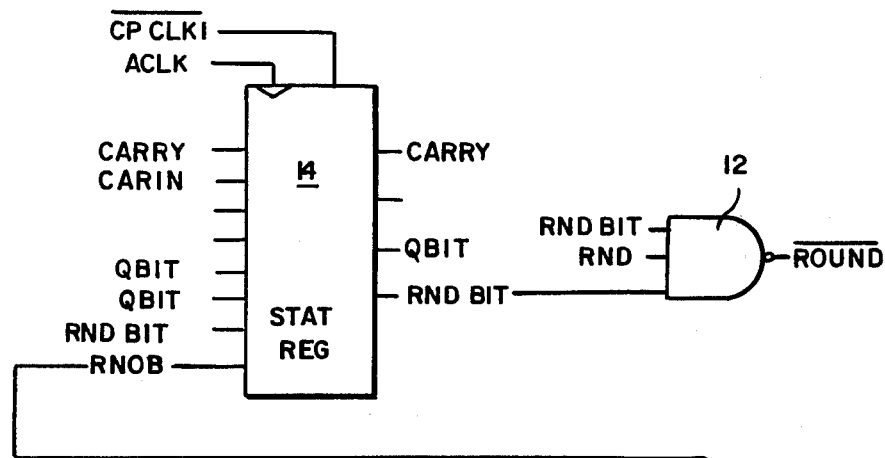
FIG. 4 shows specific logic units for use in computing the round bit for mantissa calculations in accordance with the invention.
Figure 4:
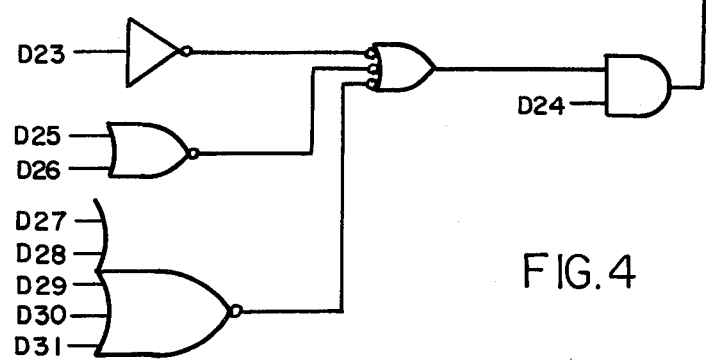

As can be seen in the above diagram, in the 32-bit calculated word the 24 bits forming the six more significant 4-bit slices (bits ∅-23) produce the unrounded floating point result, while the eight bits forming the two less significant 4-bit groups (bits 24-31) represent the bits which are used to determine the "round" bit, referred to as the "guard" bits. In each instance, each of the 4-bit slices effectively produces a carry (CRY) bit which is supplied to the next adjacent 4-bit slice, e.g., bit slice ∅-3 is effectively supplied with the carry bit CRY4 from the 4-bit slice 4-7, the latter slice is supplied with CRY8 from 4-bit slice 8-11, and so on. The CRY31 bit is supplied from microcode, while the CRY∅ bit is the carry bit for the final overall floating point result. In order to save time in the computation the carry bits are actually generated in parallel with the 4-bit computations in each of the 4-bit microprocessor slice logic units, the parallel carry bit calculations being performed in the look ahead carry generator units 11A, 11B and 11C as shown in FIG. 3. Thus, during such arithmetic operation cycle, the overall computation, including both the 4-bit additions and the carry bits generation, is performed substantially simultaneously to form the unrounded 32-bit result.

In conventional floating point computation techniques the round bit is then added during the next cycle (the round cycle) of the floating point computation, after the arithmetic operation has been completed, by appropriately decoding the guard bits to generate the round bit and then adding the round bit to bit 23 (effectively as CRY24 bit), which latter process can be achieved by using effective multiplexing techniques, for example. A certain amount of time is required for performing the multiplexing operation, and such time increases the overall data processing time for all operations. It is desirable to avoid such added processing time by reducing the time needed to generate and insert the round bit, as described below, in accordance with the invention.

The logic circuitry of the invention utilizes an additional section of look ahead generator stage 11A and associated circuitry 12, 13 and 14 for generating the round bit and for adding the round bit (as an effective CRY24 bit) in parallel with the generation and insertion of the other carry bits. Thus, the guard bits (D24-31) are supplied to appropriate gating logic 13, shown in FIG. 4 to produce the RNDB bit. Such bit is then utilized in the round enable logic 12 and 14, shown in FIG. 4 which produce the $\overline{\text{ROUND}}$ bit, the latter being supplied to the CRY24 look ahead generator 11A and, thence, to the specific 4-bit slice unit 10C which produces the least significant four bits (bits 20-23) of the (24-bit) floating point result as the final step in the arithmetic operation. Thus, the rounding of the floating point result is accomplished without adding a time interval required for the effective multiplexing of the round bit into CRY24 as required when using conventional techniques.

The technique used in accordance with the invention for detecting overflow and underflow conditions during computation of the exponent value in a floating point operation is specifically described, for convenience, with reference to the generation of a 7-bit exponent. The generation of a computed exponent value involves the addition of a first exponent value (AEXP) representing an exponent value stored in a particular register and a second exponent value (DEXP), representing an exponent value which is obtained, for example, from an external source. The AEXP and DEXP values are each defined by seven bits and their addition yields the desired exponent result (BEXP), which can be stored in another specific register. The above operation can be represented in accordance with the following relation:

$$\text{AEXP} + \text{DEXP} \rightarrow \text{BEXP}$$

If the original exponents are each represented by 7-bit values and the arithmetic operation is performed as shown above, the useful result should also be expressed by 7 bits. If such result is expressed by more than 7 bits an overflow or underflow condition exists. More particularly, 7-bit exponents, during overflow or underflow, will never yield values that require more than eight bits. Such characteristics can be understood with the help of FIG. 6 wherein a 7-bit exponent defines 128 values within a range from −64 to +63, while an 8-bit exponent defines 256 values within a range from −128 to +127. Values from +64 to +127 and values from −65 to −128 are defined as representing an overflow or underflow condition (these decimal values are obtained by interpreting the 8-bit exponents as two's complement notation binary numbers).

Figure 6:
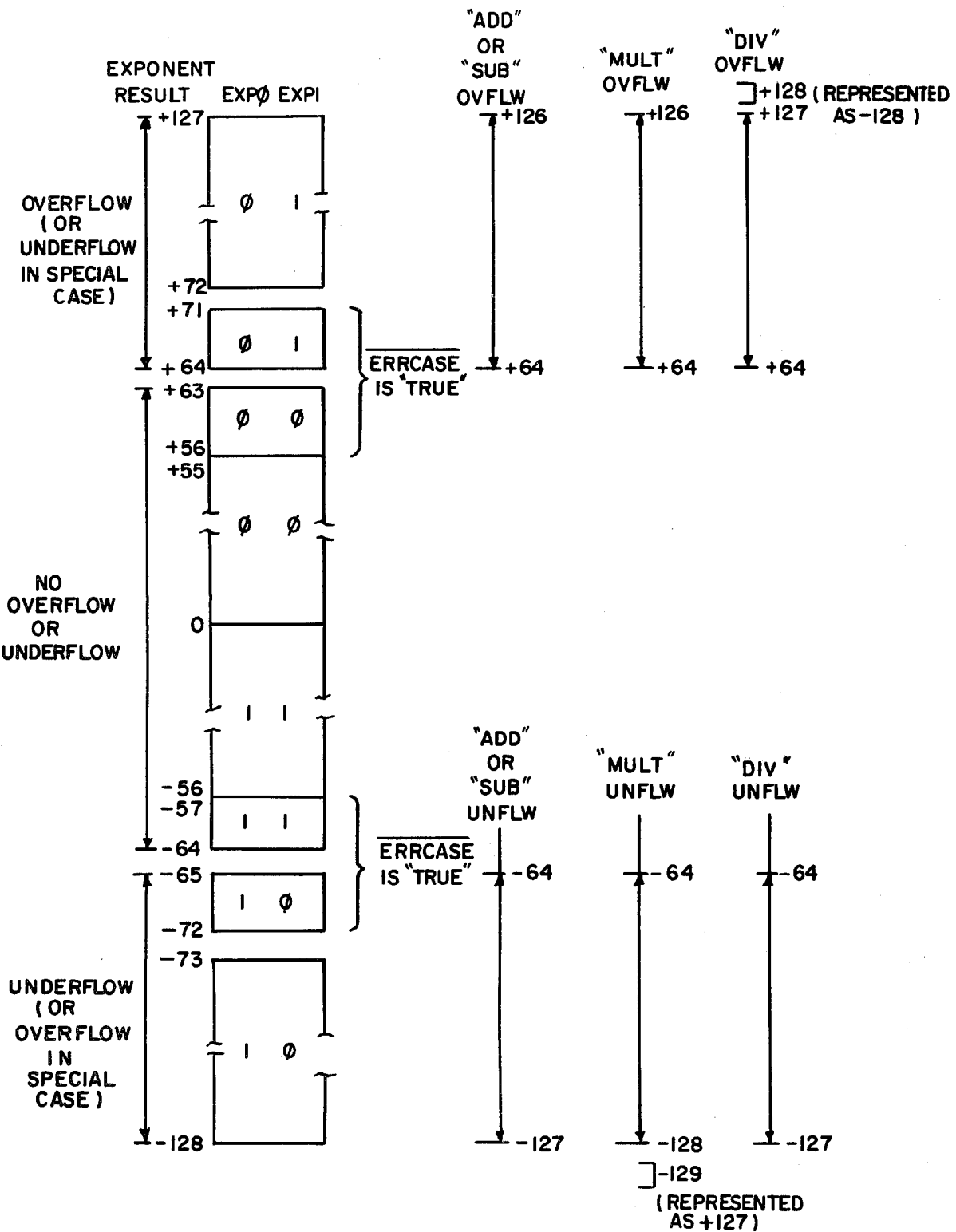
FIG. 6 shows a chart useful in explaining the overflow/underflow operation in accordance with the invention.

FIG. 6 also depicts overflow/underflow conditions for addition, subtraction, multiplication and division operations. Thus, an addition or subtraction overflow occurs within a range from +64 to +126 while an addition or subtraction underflow occurs in a range from −64 to −127. A multiply overflow occurs in a range from +64 to +126 while a multiply underflow condition occurs in a range from −64 to −129. A division overflow occurs within a range from +64 to +128, while a division underflow occurs within a range from −64 to −127. Two special conditions should be pointed out. In the multiply underflow range a special condition occurs wherein −129 is represented as +127 and in the divide overflow range a special condition occurs wherein +128 is represented as −128.

Figure 5:
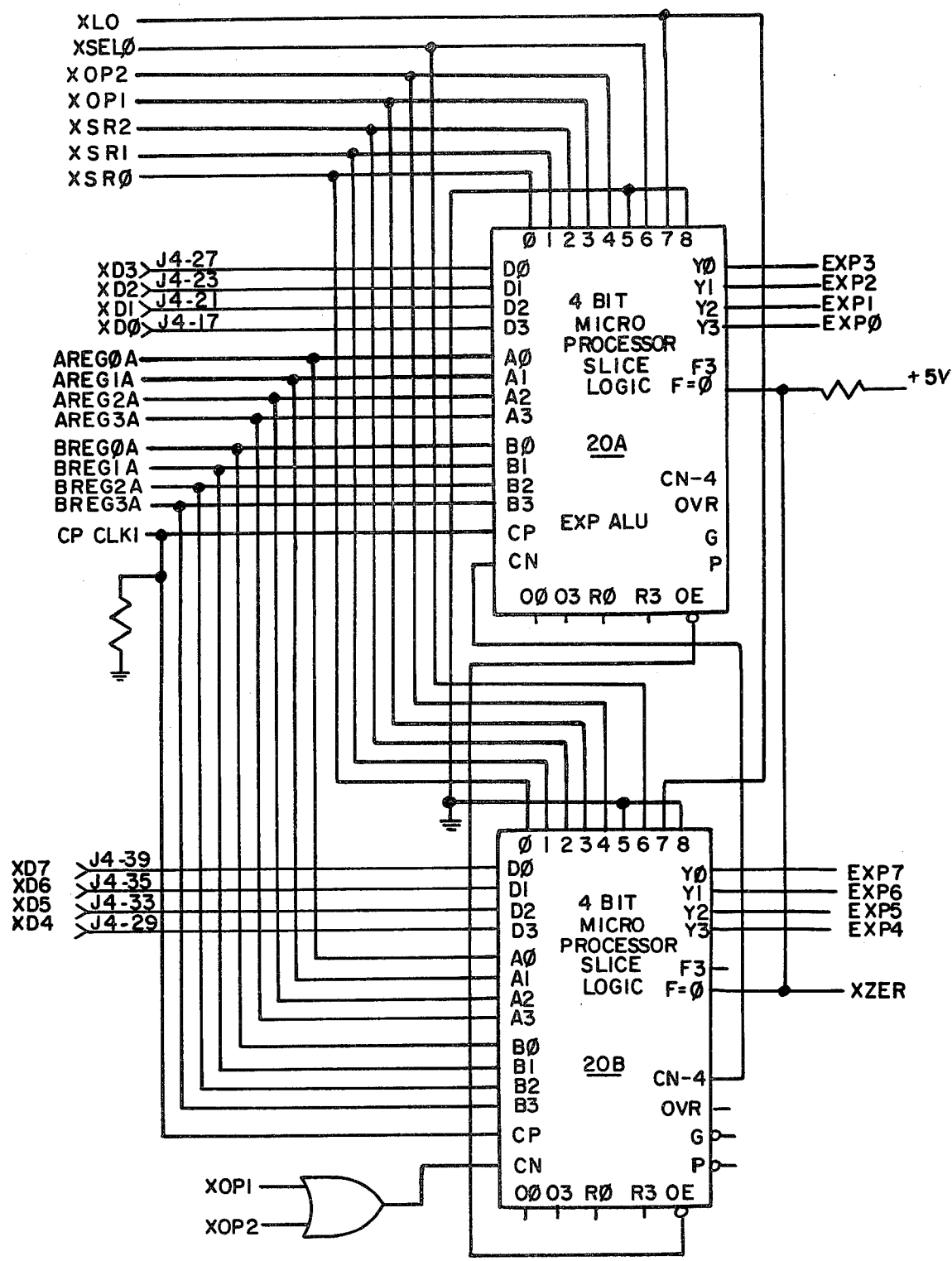
FIG. 5 shows specific 4-bit microprocessor slice logic units used in exponent calculations.

The exponent calculation is performed in two 4-bit slices as shown in FIG. 5 by 4-bit microprocessor slice logic units 20A and 20B. AEXP is addressed from the A register (AREG$\emptyset$A-3A) while the externally sourced exponent DEXP is supplied as bits XD$\emptyset$-XD7. During this calculation bits EXP$\emptyset$-7 hold the AEXP value. BEXP is then calculated and supplied to the register addressed by the B register (BREG$\emptyset$A-3A).

The system must then provide an indication of an overflow or an underflow condition, i.e., when the result falls outside the 7-bit range, and provide a suitable signal which will enable an appropriate sub-routine for handling the particular identified overflow or underflow condition. Because of the particular conventional algorithm used, during the last cycle of the exponent calculation DEXP is limited to the value which lies within the range from −8 to +7. Thus, the value ranges of interest in the register AEXP (addressed by AREG) are as shown in FIG. 6. They include a middle range from −56 to +55 in which it is clear there will be no overflow or underflow error condition (i.e., even where DEXP is at its −8 or +7 limits, the final result would not lie in an overflow or underflow range), an upper range from +72 to +127 and a lower range from −73 to −128. In the latter ranges it is clear that no matter what DEXP value during the last cycle, the final result would clearly be in an overflow or an underflow range. In the two cross-over ranges (+56 to +71) and (−57 to −72) the overflow or underflow conditions must be determined, depending on the value of the DEXP within its limits during the last cycle of the exponent calculation.

Figure 7:
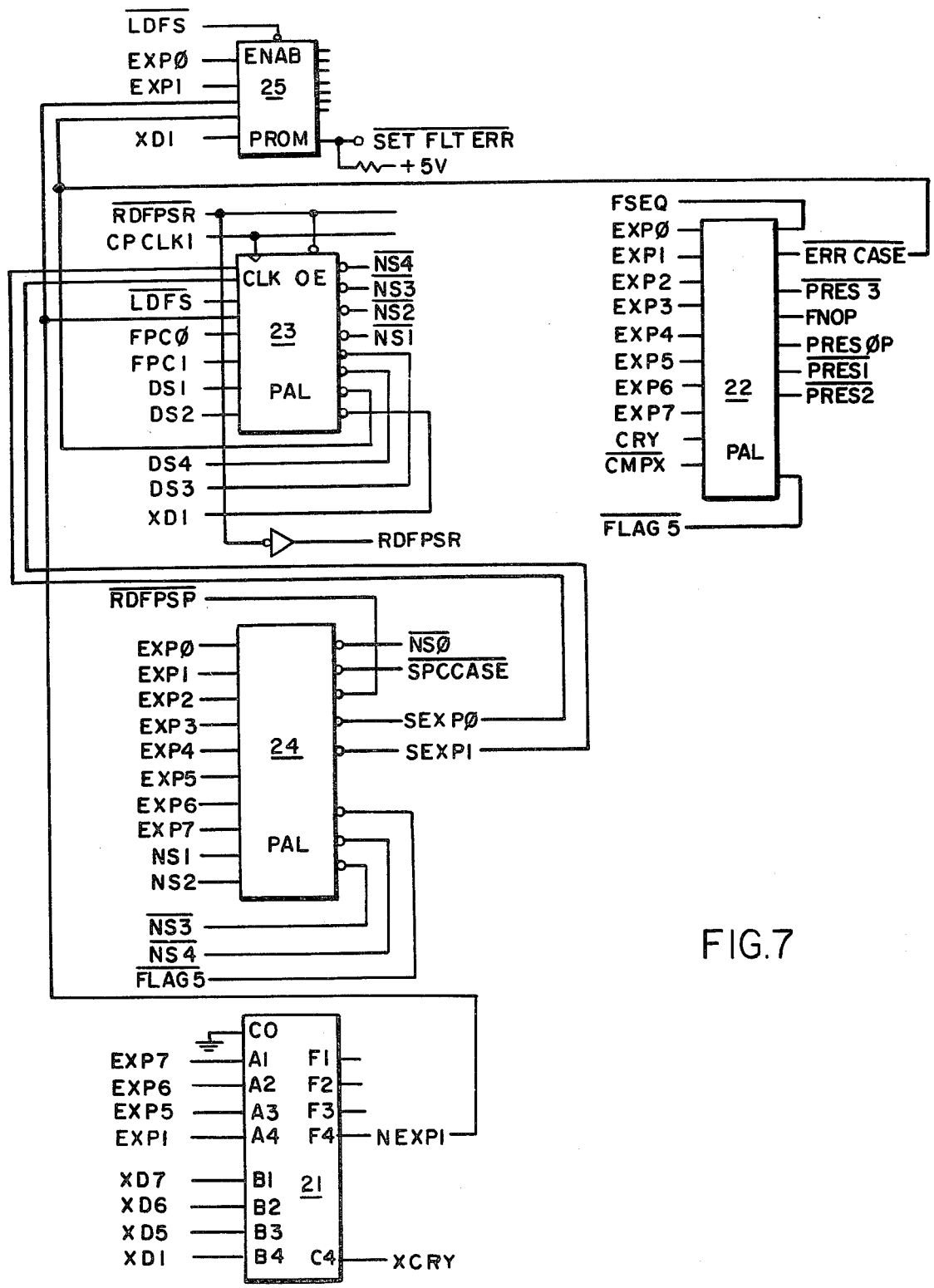
FIG. 7 shows logic units used to detect overflow/underflow conditions and to provide an indication thereof to the data processor system.

An NEXP1 bit is obtained by adding selected EXP1 and EXP5-7 of the AEXP with bits XD1 and XD5-7 of the DEXP, as shown by 4-bit adder unit 21 of FIG. 7. An $\overline{\text{ERR CASE}}$ signal is derived from AEXP bits EXP-$\emptyset$-7 via programmable array logic unit 22 in FIG. 7. The overflow/underflow status of the exponent calculation is defined by the $\overline{\text{NS1}}$ and $\overline{\text{NS2}}$ bits from programmable array logic (PAL) 23 in FIG. 7. In an overflow condition, programmable array logic 23 asserts an $\overline{\text{NS1}}$ signal while in an underflow condition an $\overline{\text{NS2}}$ bit is asserted. Bits SEXP$\emptyset$ and SEXP1 are derived from AEXP bits EXP$\emptyset$-7 and signal $\overline{\text{FLAG 5}}$ indicating multiply or divide, in PAL 24.

This logic is provided to detect generally in which range the final floating point exponent result resides and, more particularly, provides a capability of determining where within the cross-over regions the final result lies so as to determine whether an overflow or underflow condition exists within such latter regions. In order to do so, examination of the selected AEXP bits and the selected DEXP bits is made in accordance with the following chart, an explanation of which can be understood in connection with FIG. 6, by the above described logic. Note that signals SEXP$\emptyset$ and SEXP1 in all cases, except for the special case described in the chart and below, are equal to EXP$\emptyset$ and EXP1, respectively.

---

OVERFLOW ($\overline{\text{NS1}}$)

IF $\overline{\text{ERR CASE}}$ SEXP$\emptyset$,1 = $\emptyset\emptyset$ \quad $\emptyset$1 \quad $\emptyset$1
IS "TRUE" \quad NEXP1 = 1 } OR 1 } OR (DON'T CARE)
\quad\quad\quad\quad\quad XD1 = $\emptyset$ \quad 1 \quad $\emptyset$ IF $\overline{\text{ERR CASE}}$
\quad\quad\quad\quad SEXP$\emptyset$,1 = $\emptyset$1
IS "FALSE"

UNDERFLOW ($\overline{\text{NS2}}$)

IF $\overline{\text{ERR CASE}}$ SEXP$\emptyset$,1 = 11 \quad 1$\emptyset$ \quad 1$\emptyset$
IS "TRUE" \quad NEXP1 = $\emptyset$ } OR $\emptyset$ } OR (DON'T CARE)
\quad\quad\quad\quad\quad XD1 = 1 \quad $\emptyset$ \quad 1

IF $\overline{\text{ERR CASE}}$
\quad\quad\quad\quad SEXP$\emptyset$,1 = 1$\emptyset$
IS "FALSE"

SPECIAL CASE:

$\overline{\text{SPC CASE IS}}$ "TRUE" when
MULTIPLY UNDERFLOW EXP =

+127 (real value is −129, $\overline{\text{FLAG 5}}$ is true)
DIVISION OVERFLOW EXP =

−128 (real value is +128, $\overline{\text{FLAG 5}}$ is false)

IF $\overline{\text{SPC CASE}}$ IS "TRUE" SEXP$\emptyset$,1
VALUES ARE INVERTED

SEXP$\emptyset$,1 $\leftarrow$ $\overline{\text{EXP$\emptyset$,1}}$

IF $\overline{\text{SPC CASE}}$ IS "FALSE" SEXP$\emptyset$,1
VALUES REMAIN THE SAME SEXP$\emptyset$,1 $\leftarrow$ EXP$\emptyset$,1

---

The cases set forth in the above chart depict the situations in which an overflow or an underflow condition exists in the final computed exponent result. The values of the condition indicator bits SEXP$\emptyset$,1, NEXP1, XD1 and $\overline{\text{ERR CASE}}$ are utilized during the last computation cycle in effect to predict the presence or absence of overflow or underflow condition in the final exponent result BEXP.

In order to access the desired sub-routine for handling overflow or underflow conditions, a signal for indicating that one of such conditions has occurred is provided to the system as the $\overline{\text{SET FLT ERR}}$ signal from PROM unit 25 (see FIG. 7). The latter signal is determined by the states of the first two AEXP indicator bits (directly accessible as EXP$\emptyset$ and EXP1 from 4-bit slice logic unit 20A), by the NEXP1 indicator bit (determined by selected EXP 1, 5, 6 and 7 and XD 1, 5, 6 and 7 bits as discussed above), by the $\overline{\text{ERR CASE}}$ indicator bit, and by indicator bit XD1, the second most significant bit of the DEXP, as shown in FIG. 7, The status of such bits in determining the overflow and underflow conditions is defined in the chart set forth above. In effect $\overline{\text{SET FLT ERR}}$ is "true" when either $\overline{\text{NS1}}$ or $\overline{\text{NS2}}$ is "true."

While the add ("ADD") or subtract ("SUB") overflow and underflow conditions are relatively straightforward, as shown in FIG. 6, special cases exist for a multiply ("MULT") calculation wherein an underflow condition exists over a range from −64 to −129 and for a divide ("DIV") calculation wherein an overflow condition exists over a range from +65 to +128. The special cases are as follows: in multiply at −129, which is represented as +127, and in divide at +128, which is represented as −128. Such special cases are determined by programmable array logic 24 in FIG. 7, wherein the AEXP bits EXP$\emptyset$-7 are examined as well as the signal $\overline{\text{FLAG 5}}$ which is set "true" during multiply and "false" during divide by microcode. If a special case condition (+127 for a MULT and −128 for a DIV) exists, a $\overline{\text{SPCCASE}}$ signal is generated ($\overline{\text{SPCCASE}}$ is "true"). In such conditions the values of SEXP$\emptyset$ and SEXP1 must be inverted. That is, when $\overline{\text{SPCCASE}}$ is "true" SEXP$\emptyset$=$\overline{\text{EXP}\emptyset}$ and SEXP1=$\overline{\text{EXP1}}$. So long as $\overline{\text{SPCCASE}}$ is "false," no change is made in the values of SEXP$\emptyset$ and SEXP1. That is, SEXP$\emptyset$=EXP$\emptyset$ and SEXP1=EXP1.

Accordingly, the above discussed logic not only computes the status of the floating point result but also simultaneously computes a $\overline{\text{SET FLT ERR}}$ signal which is supplied to the system (in this case the address translation unit (ATU) of the system shown in the aforementioned Rasala et al. application) for accessing the desired sub-routine for handling the overflow or underflow conditions, such operations occurring substantially at the same time that the overall exponent addition operation occurs in the computation of the floating point result (in the computation of the BEXP value).

In order to achieve full precision in the results obtained for multiplication and division operations of an arithmetic logic unit or a floating point computation unit, the use of a conventional multiplication algorithm (known as a "two-bit Booth's algorithm") requires that the multiplicand and partial product operands be extended by two additional bits (e.g., when using 32-bit or 64-bit words such operands must be extended to 34 bits and 66 bits, respectively) and the use of a conventional division algorithm (known as a "non-restoring divide" algorithm) requires extension of the dividend and divisor operands by one additional bit (e.g., when using 32-bit or 64-bit words such operands must be extended to 33 bits or 65 bits, respectively). It is desirable to provide a technique for extending the words involved which does not require adding an extra 4-bit microprocessor slice logic unit.

Figure 8:
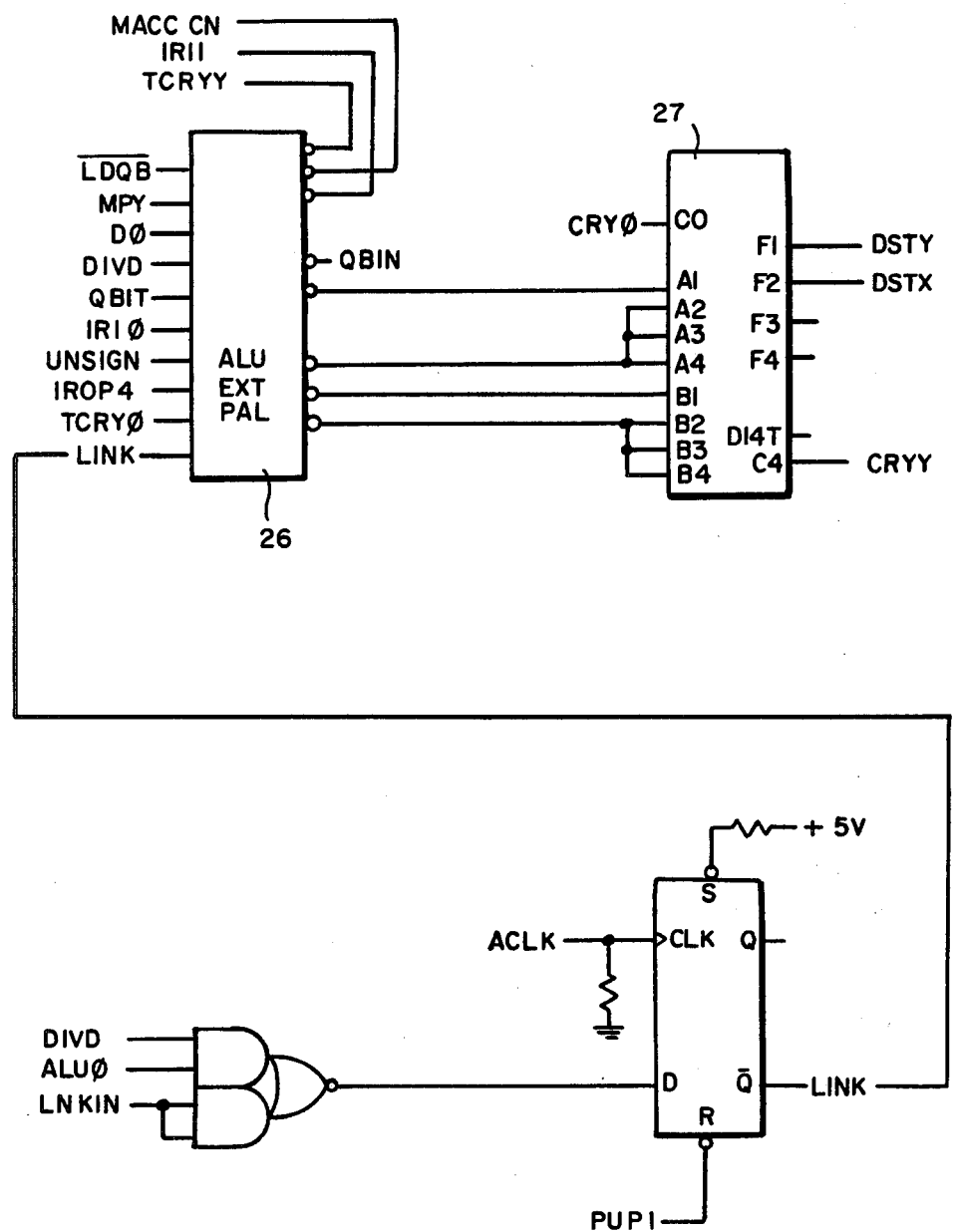
FIG. 8 shows logic units used to provide extension bits for use in multiply or divide operations in accordance with the invention.

A technique for providing the desired arithmetic extensions is shown in FIG. 8 which depicts a programmable array logic unit 26 and a simple 4-bit adder unit 27. The following analyses assist in explaining the operation of units 26 and 27 for a multiply or division operation.

In the system design described herein, the multiply operation provides a result by adding a value A to the product of two values B and C, i.e., the multiply result is A+(BXC). A multiply operation may be signed or unsigned. In accordance with the conventional multiply algorithm, a signed multiply operation requires both a first operand (the partial product) and a second operand (either a $\emptyset$, the multiplicand, or twice the multiplicand) to be sign extended. An unsigned multiply operation requires the first operand to be sign extended (except in the first multiplication cycle) and requires the second operand to be zero extended. The chart set forth below depicts the two extended bits for both the first and second operands for the various multiply operations.

| OPER-AND | ADD | | SUBTRACT | | |
|---|---|---|---|---|---|
| | | SIGNED MULTIPLY | | | |
| 1st | Do | Do | Do | Do | |
| 2nd | +$\emptyset$ | $\emptyset$ | +1 | 1 | ±$\emptyset$ |
| 1st | Do | Do | Do | Do | |
| 2nd | +$Q_B$ | $Q_B$ | +$Q_B$ | $Q_B$ | ±MULTIPLICAND |
| 1st | Do | Do | Do | Do | |
| 2nd | +$Q_B$ | $Q_B$ | +$Q_B$ | $Q_B$ | ±2 × MULTIPLICAND |
| | | UNSIGNED MULTIPLY | | | |
| 1st | Do | Do | Do | Do | |
| 2nd | +$\emptyset$ | $\emptyset$ | +1 | 1 | +$\emptyset$ |
| 1st | Do | Do | Do | Do | |
| 2nd | +$\emptyset$ | $\emptyset$ | +1 | 1 | ±MULTIPLICAND |
| 1st | Do | Do | Do | Do | |
| 2nd | +$\emptyset$ | $Q_B$ | +1 | $Q_B$ | +2 × MULTIPLICAND |

In the above chart Do represents the most significant bit of the first operand and $Q_B$ represents the most significant bit of the second operand.

In the special case of an unsigned multiply during the first multiply cycle (when the partial product is the value A) the first operand (partial product) is zero extended as follows:

| UNSIGNED MULTIPLY (DURING FIRST CYCLE) | | | | | |
|---|---|---|---|---|---|
| OPER-AND | ADD | | SUBTRACT | | |
| 1st | $\emptyset$ | $\emptyset$ | $\emptyset$ | $\emptyset$ | |
| 2nd | +0 | $\emptyset$ | +1 | 1 | +$\emptyset$ |
| 1st | $\emptyset$ | $\emptyset$ | $\emptyset$ | $\emptyset$ | |
| 2nd | +$\emptyset$ | $\emptyset$ | +1 | 1 | ±MULTIPLICAND |
| 1st | $\emptyset$ | $\emptyset$ | $\emptyset$ | $\emptyset$ | |
| 2nd | +$\emptyset$ | $Q_B$ | +1 | $Q_B$ | ±2 × MULTIPLICAND |

The signal D$\emptyset$ contains the value of Do and QBit contains the value of $Q_B$ in the above chart.

The programmable array logic 26 handles the generation of the above values for the first and second operands as shown in FIG. 8. IRI$\emptyset$ and IRI1 bits identify the cases set forth below, the IROP4 signifies an "add" or "subtract" operation during the multiply, the UNSIGN bit signifies a signed or an unsigned multiply operation and the $\overline{\text{MACC EN}}$ bit signifies operation either in the first multiply cycle or in a cycle other than the first multiply cycle, as set forth below. The signal MPY is "true" during multiply cycles.

| BITS | | |
|---|---|---|
| IRI1 | IRI$\emptyset$ | SIGNIFY |
| $\emptyset$ | $\emptyset$ | ±$\emptyset$ |
| $\emptyset$ | 1 | ±MULTIPLICAND |
| 1 | $\emptyset$ | ±2 × MULTIPLICAND |
| 1 | 1 | ±$\emptyset$ (REDUNDANT) |
| | IR$\emptyset$P4 | |
| | $\emptyset$ | ADD |
| | 1 | SUBTRACT |

-continued

| UNSIGN | |
|---|---|
| ∅ | SIGNED |
| 1 | UNSIGNED |

| MACC EN | |
|---|---|
| ∅ | FIRST MULTIPLY CYCLE |
| 1 | NOT FIRST MULTIPLY CYCLE | where in each case ∅≡Low and 1≡High.

Bits IRI1, IRI∅, and IR∅P4 are generated in accordance with the particular multiply algorithm which is used, utilizing known logic techniques, and bits MPY, UNSIGN and MACC EN are obtained from microcode control, in accordance with well known techniques.

Thus, input bits to programmable array logic 26 as specified above provide the two operand extension bits at the A-inputs (first operand) and the B-inputs (second operand) of adder unit 27. The resulting addition produces the extension bits DSTX and DSTY for the next partial product as shown in FIG. 8. The required CRY∅ bit is also input to adder unit 27 as mentioned above. In the PAL unit 26 the LDQB, TCRY∅ and QBIN are used for purposes other than in the multiply or divide operations and need not be discussed further.

With reference to division operations, in accordance with the aforementioned conventional divide algorithms, the first operand is the dividend and the second operand is the divisor. In an unsigned divide operation, during each divide cycle the first operand is always extended by the most significant bit of the result from the last divide cycle (identified as the LINK bit, as shown in FIG. 8) while the second operand is always zero extended, as follows:

| | UNSIGNED DIVISION | |
|---|---|---|
| | ADD | SUBTRACT |
| 1st OPERAND | LINK | LINK |
| 2nd OPERAND | +∅ | +1 |

The TCRYY bit signifies whether an "add" or "subtract" is required, as follows:

| TCRYY | SIGNIFIES |
|---|---|
| ∅ | ADD |
| 1 | SUBTRACT |

The carry bit (CRYY) from adder unit 27 resulting from the above additions of the LINK bit and the ±∅ bit is the quotient bit and such bit is registered for the next divide cycle, the registered value being designated the TCRYY bit. The PAL unit 26 and adder 27, thus, determine the carry bit required for the divide operation from the extended bits of the dividend (first operand) and the divisor (second operand). The signal DIVD is "true" during divide cycles as set by microcode.

Figure 2:
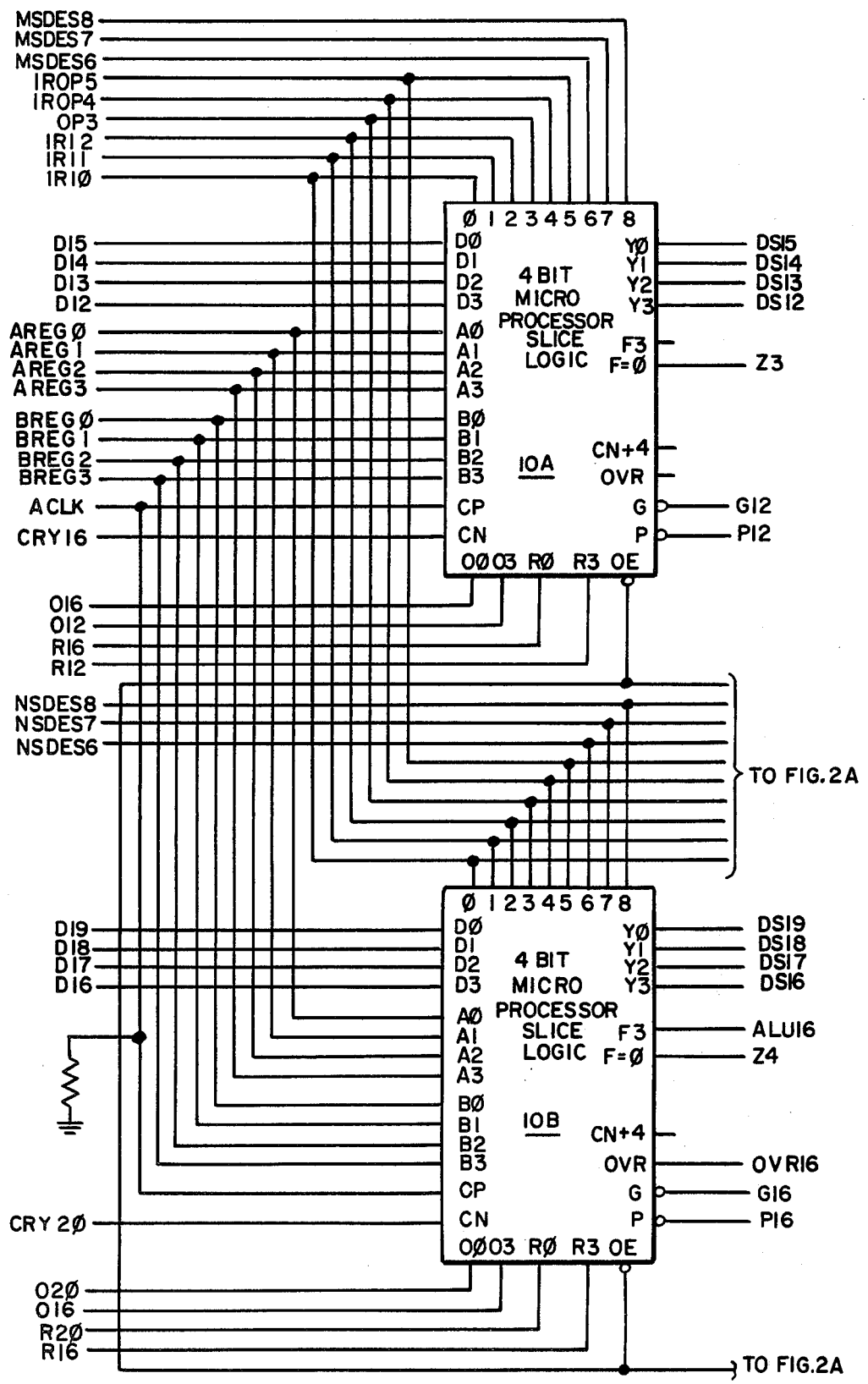
FIGS. 2-2D show specific 4-bit microprocessor slice logic units used in mantissa calculations.
Figure 2A:
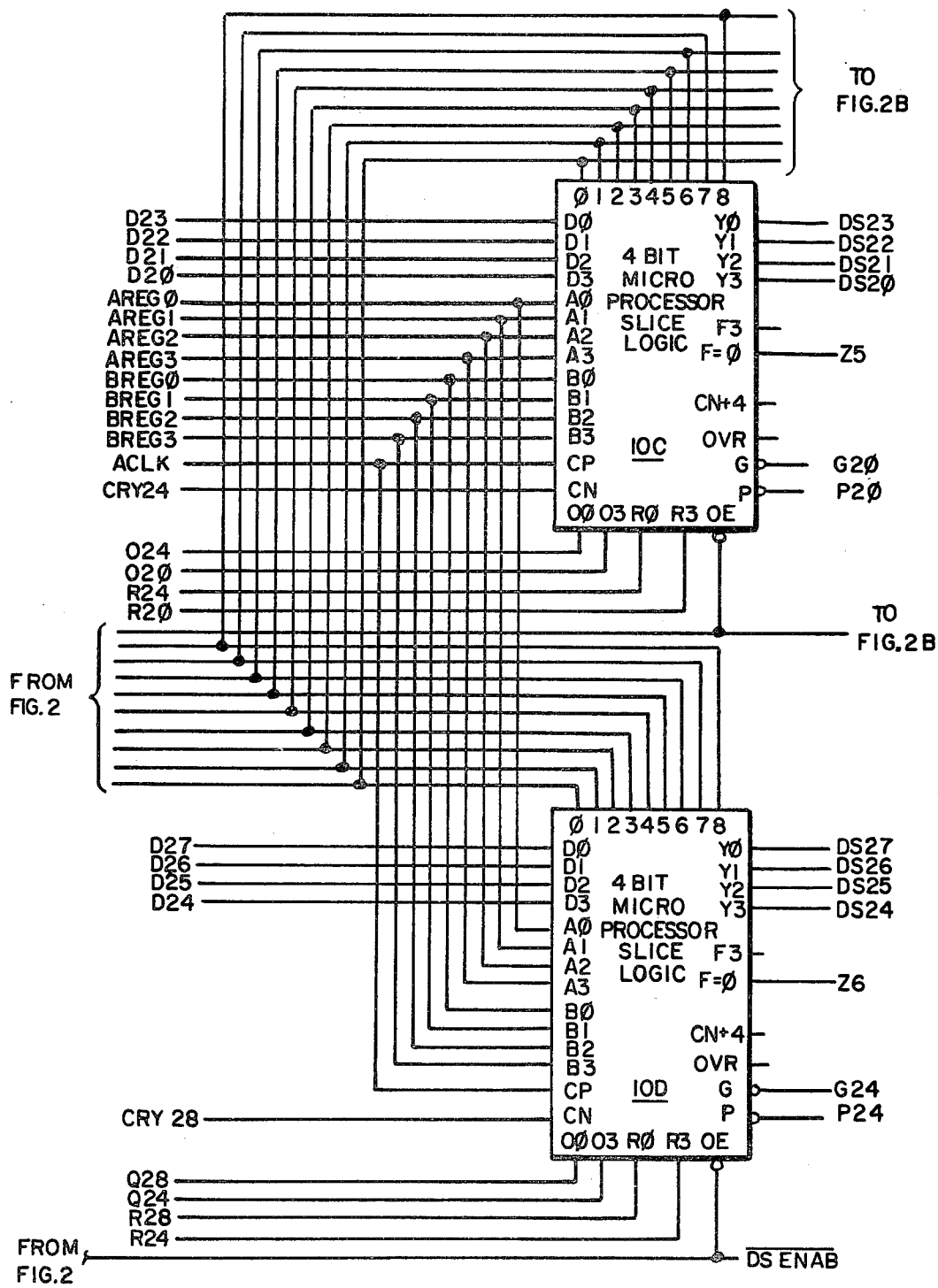
Figure 2B:
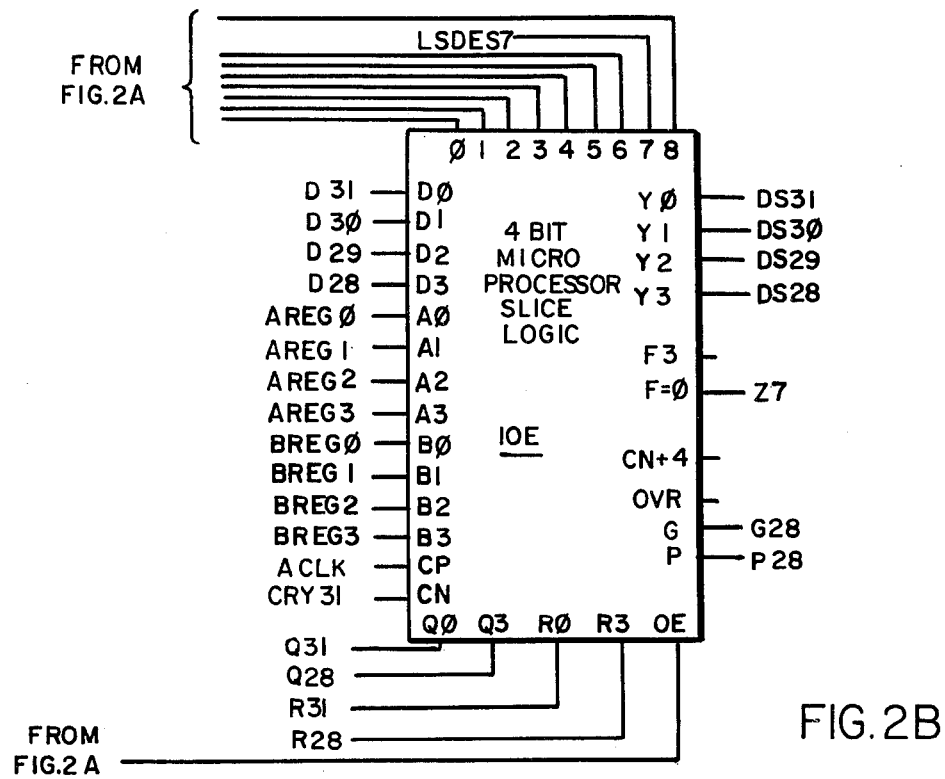
Figure 2D:
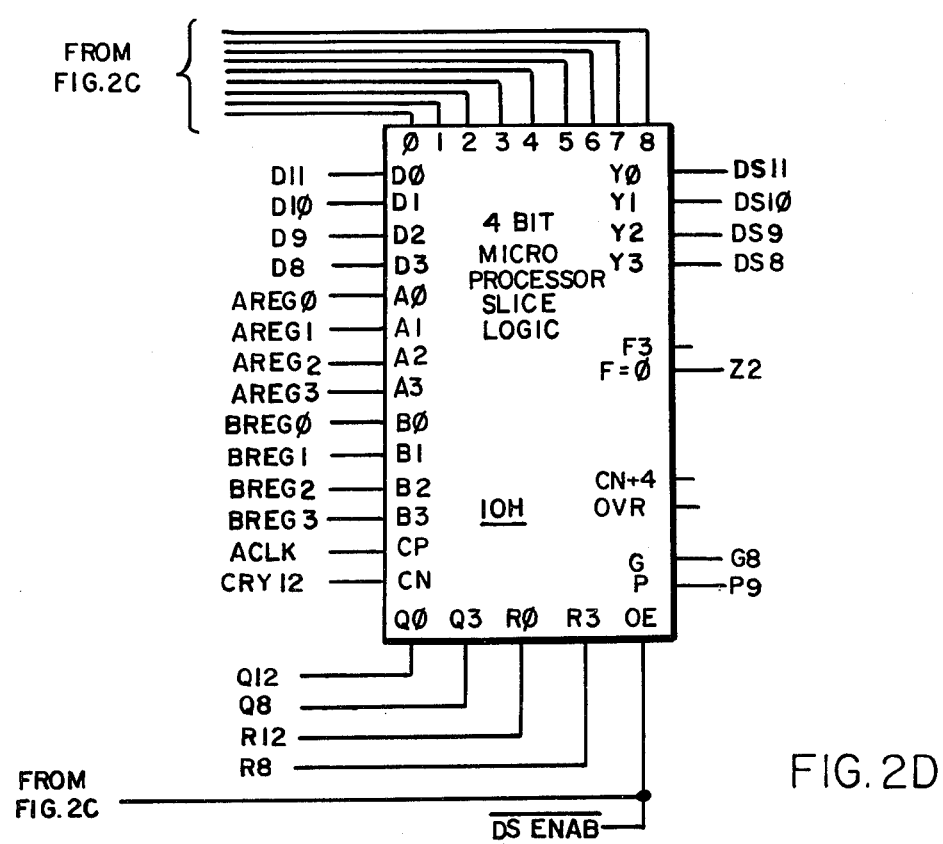
Figure 2C:
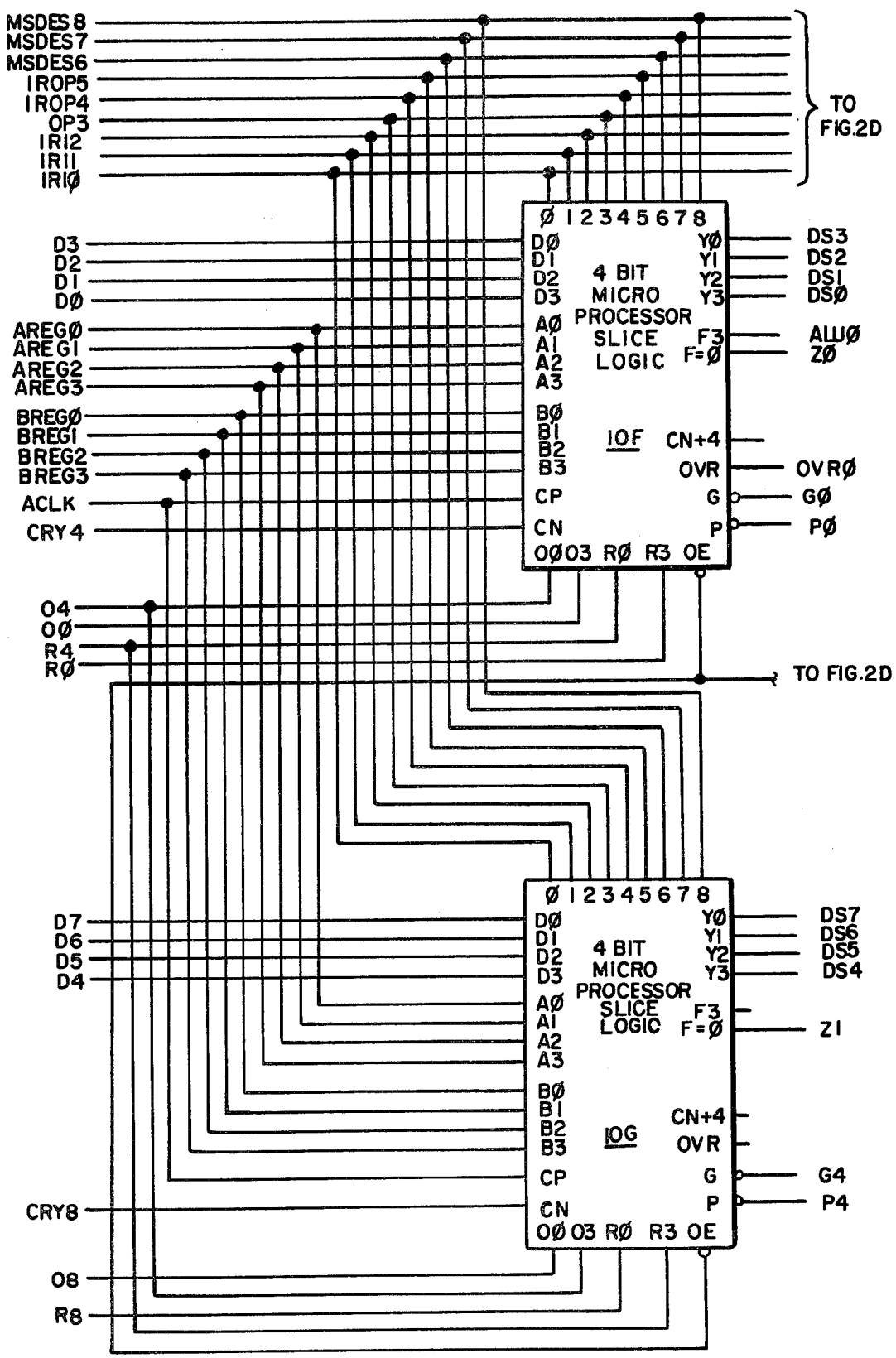

Accordingly, the use of PAL unit 26 and adder unit 27 provides for the extension requirements in both a multiply and a divide operation without requiring the use of an additional 4-bit microprocessor slice logic unit of the type depicted for the 32 bits shown in FIG. 2 or for 8 bits shown in FIG. 5.

What is claimed is:

1. In a data processing system, an arithmetic logic unit for performing floating point arithmetic which requires unbiased rounding of the floating point arithmetic result, said unit comprising means for computing an unrounded floating point result comprising a plurality of bit groups, a first selected number of said bit groups being used to form the rounded floating point result and a second selected number of said bit groups being used to determine the round bit for said rounded result;

a plurality of look-ahead logic means for generating carry bits, for insertion into selected ones of said bit groups of said unrounded floating point result, substantially simultaneously with the computation of said unrounded floating point result;

means responsive to said second selected number of bit groups of said unrounded floating point result for determining said round bit;

a portion of a selected one of said look-ahead logic means being responsive to said round bit for inserting said round bit into the least significant bit group of said first selected number of bit groups substantially simultaneously with the insertion of the carry bits into the remaining bit groups of said first selected number thereof to produce said rounded floating point result.

2. In a data processing system in accordance with claim 1 wherein said round bit determining means includes means responsive to said second selected number of bit groups for producing a decoded bit;

enable logic means responsive to said decoded bit for producing said round bit and for supplying said round bit to said portion of said selected one of said look-ahead logic means.

3. In a data processing system in accordance with claims 1 or 2 wherein said unrounded floating point result comprises thirty-two bits, designated as bits ∅-31, including twenty-four bits, designated as bits ∅-23, used to form said rounded floating point result and eight bits, designated as bits 24-31, used to determine said round bit.

4. In a data processing system in accordance with claim 3 wherein said unrounded floating point result comprises eight four-bit groups, said rounded floating point result having six four-bit groups and said round bit determining bits having two four-bit groups.

5. In a data processing system in accordance with claim 4 wherein said carry bits are formed as carry bits CRY4, CRY8, CRY12, CRY16, CRY20, CRY24 and CRY28 for insertion into bits 3, 7, 11, 15, 19, 23 and 27, respectively, of said unrounded floating point result, said round bit being inserted as CRY24 into bit 23 to form said rounded floating point result.

* * * * *

UNITED STATES PATENT AND TRADEMARK OFFICE
CERTIFICATE OF CORRECTION

PATENT NO. : 4,442,498
DATED : April 10, 1984
INVENTOR(S) : Josh Rosen

It is certified that error appears in the above—identified patent and that said Letters Patent is hereby corrected as shown below:

On the Title page, at Item [73], please identify the Assignee as follows:

--Assignee: Data General Corporation, Westboro, Massachusetts--

Signed and Sealed this

Fifteenth Day of January 1985

[SEAL]

Attest:

Attesting Officer

GERALD J. MOSSINGHOFF

Commissioner of Patents and Trademarks